US008441783B2

(12) United States Patent  
Tanaka et al.

(10) Patent No.: US 8,441,783 B2  
(45) Date of Patent: May 14, 2013

(54) INFORMATION-PROCESSING EQUIPMENT

(75) Inventors: Shintaro Tanaka, Osaka (JP); Akira Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/871,986

(22) Filed: Aug. 31, 2010

(65) Prior Publication Data

US 2011/0075356 A1    Mar. 31, 2011

(30) Foreign Application Priority Data

Sep. 28, 2009   (JP) ................................. 2009-222214

(51) Int. Cl.
*H05K 5/03*   (2006.01)

(52) U.S. Cl.
USPC ................. 361/679.09; 361/679.26; 248/917; 16/250

(58) Field of Classification Search ............. 361/679.01, 361/679.02, 679.21, 679.22, 679.26, 679.27; 361/679.09; 248/917–924; 16/250, 251, 16/268

See application file for complete search history.

(56) References Cited

U.S. PATENT DOCUMENTS

| 6,344,967 B2* | 2/2002 | Zamora et al. ........... 361/679.09 |
| 6,853,336 B2* | 2/2005 | Asano et al. .................. 343/702 |
| 8,174,452 B2* | 5/2012 | Ayala Vazquez et al. ..... 343/702 |
| 2008/0310088 A1* | 12/2008 | Chen ............................ 361/680 |

FOREIGN PATENT DOCUMENTS

| JP | 2002-84117 | 3/2002 |
| JP | 2008-28907 | 2/2008 |
| JP | 2009-169830 | 7/2009 |

* cited by examiner

*Primary Examiner* — Jinhee Lee  
*Assistant Examiner* — Ingrid Wright  
(74) *Attorney, Agent, or Firm* — Wenderoth, Lind & Ponack, L.L.P.

(57) ABSTRACT

There is provided a laptop personal computer comprising: a first chassis 11 accommodating a display section and having a basic shape of substantially rectangle in a planar view; a second chassis 31 accommodating an operation control section and having a basic shape of substantially rectangle in a planar view; and a hinge mechanism 20 for coupling one side 31r of the second chassis and one side 11r of the first chassis and supporting both chassis in a relatively openable and closable manner, wherein the first chassis is provided with a projection part 19 at an edge portion of an other side 11f opposing to the one side 11r, the projection part is formed along the other side and projects to the second chassis side in a state where the first chassis is closed together with the second chassis.

3 Claims, 5 Drawing Sheets

INFORMATION-PROCESSING EQUIPMENT

BACKGROUND OF THE INVENTION

The present invention relates to an openable and closable folding information-processing equipment, for example a laptop personal computer (hereinafter called "laptop PC" as an abbreviated expression, appropriately), specifically to a structure of chassis in such an information-processing equipment.

As is well known, the chassis of the openable and closable folding information-processing equipment such as a laptop PC and the like, is constituted by a display section side chassis (hereinafter called a "first chassis", appropriately) which accommodates the display section having a display screen such as a liquid crystal type and an operation control section side chassis (hereinafter called a "second chassis", appropriately) which accommodates the operation control section capable of generating a display signal which is to be inputted into the display section. Both chassis are coupled together by a hinge mechanism in a relatively openable and closable manner. In more detail, both the first chassis and the second chassis are usually formed to a substantially rectangle shape in a planar view, and each one side (a rear side from a user's view in a state where the user uses the electronic equipment) of the first and the second chassis are coupled together via a hinge mechanism, thereby both chassis can perform relatively opening and closing motion around a hinge axle. It is to be noted that the operation control section includes an input device such as a keyboard, signal processing circuits for generating display signals outputted to the display section based on input operations by the input device, a central processing unit (so-called CPU), and peripheral components thereof.

Recently, information-processing equipment with wireless communication functions with the outside world have become popular. As a wireless communication antenna equipped to the information-processing equipment, a very thin and compact one which is constituted by forming antenna pattern on a substrate (antenna substrate) is widely employed. When mounting such an antenna to a chassis of the information-processing equipment, it is generally recommended, in order to ensure better antenna characteristics, to mount it to the display section side chassis (the first chassis) rather than to the operation control section side chassis (the second chassis) to which the user's fingers tend to touch more frequently.

Japanese Patent Laid-open Publication No. 2008-28907, for example, discloses a constitution for disposing antenna substrates, in parallel to the glass plate, to so-called escutcheon part which forms a border part positioned between an outer periphery of the first chassis and the glass plate of the display screen and plays a roll of a kind of decorative panel, in mounting the antenna substrates to the first chassis of the display section side among the two chassis of the first and the second ones having the above-described construction.

Specifically recent years, in accordance with growing request for making information-processing equipments such as laptop PCs further thinner, the first chassis of the display section side is also requested to be made further thinner, and, with its progress, the rigidity of the first chassis inevitably tend to decrease. However, when making the transition between the open state and the closed state of the information-processing equipment, usually the user opens and/or closes the first chassis by holding the peripheral portion thereof. Therefore, the first chassis must ensure sufficient torsion rigidity to endure the torsion generated by the opening and/or closing motion.

Further, when an impact load is applied, in a state where the first chassis and the second chassis are closed together, from the other side opposing to the one side with a hinge connection of the information-processing equipment (that is, from a near side viewing from the user in a state the user operates the information-processing equipment) by dropping it with a front side surface downwardly, for example, the inputted impact load reaches, as it is, to the hinge mechanism. Specifically, when the impact load is applied from forward and upward direction, most of the impact load reaches, as it is, to the hinge mechanism via the first chassis. Therefore, the hinge mechanism must be sufficiently firm so that it has a sufficient strength to endure such an impact load. This may bring disadvantages in aiming to make the information-processing equipment further lighter and thinner.

It is common knowledge that a better antenna characteristics is obtained with longer distance from the antenna substrates to the display screen (that is, to the drive circuits of the display screen) in mounting the antenna substrates to the first chassis of the display section side. When the antenna substrates are disposed in parallel to the display screen like the conventional art (refer to Japanese Patent Laid-open Publication No. 2008-28907), it is required, in order to ensure a long distance from the antenna substrates to the display screen, to enlarge the width of the border part (that is, the escutcheon part) of the first chassis. However, enlarging the width of the escutcheon part is to result in restraining the size of the display screen.

SUMMARY OF THE INVENTION

The present invention was made in view of the foregoing technical problems. A basic object of the present invention is to enable to enhance the torsion rigidity of the first chassis of the display section side by a relatively simple constitution, and to reduce the impact load reached to the hinge mechanism when an impact load is applied to the information-processing equipment, in a state where the first chassis and the second chassis are closed together, from forward and upward direction.

Therefore, an information-processing equipment according to the present invention includes: a first chassis accommodating a display section with covering a periphery and a back face thereof, and having a basic shape of substantially rectangle in a planar view; a second chassis accommodating an operation control section capable of generating a display signal to be inputted into the display section, and having a basic shape of substantially rectangle in a planar view; and a hinge mechanism for coupling one side of the second chassis and one side of the first chassis and supporting both chassis in a relatively openable and closable manner. And, the first chassis is provided with a projection part at an edge portion of an other side opposing to the one side, the projection part is formed along the other side and projects to the second chassis side in a state where the first chassis is closed together with the second chassis.

In the present invention, the first chassis is provided with the projection part at the edge portion of the other side opposing to the one side (hinge side), the projection part is formed along the other side and projecting to the second chassis side in a state where the first chassis is closed together with the second chassis. And the rigidity of the first chassis is enhanced by the projection part extending along the other side. That is, the rigidity of the first chassis can be enhanced by a relatively simple constitution only to provide such a "projection part extending along the other side" to the first chassis, and it becomes to be possible relatively easily to ensure sufficient torsion rigidity to endure the torsion generated by the opening and/or closing motion when the user opens and/or closes the first chassis by holding the peripheral portion thereof in making the transition between the open state and the closed state of the information-processing equipment. Further, when the user opens and/or closes the first chassis by holding the edge portion of the other side thereof, the holding performance also can be enhanced.

In one embodiment of the present invention, it is preferable that the second chassis is provided with a step part at a edge portion of an other side opposing to the one side, the step part is formed along the other side and receiving the projection part of the first chassis in a state where the second chassis is closed together with the first chassis.

According to this construction, since the second chassis is provided with a step part for receiving the projection part of the first chassis in a state where the second chassis is closed together with the first chassis, the projection part of the first chassis is received and taken in the step part of the second chassis. Therefore, it is no need to increase the thickness in whole of the first chassis, even the first chassis is provided, at the edge portion of the other side, with a projection part for projecting to the second chassis side in a state where the first chassis is closed together with the second chassis. Further, the second chassis is provided with the step part for receiving the projection part of the first chassis in a state where the second chassis is closed together with the first chassis. Thereby, when an impact load is applied to the information-processing equipment, in a state where the first chassis and the second chassis are closed together, from forward and upward direction, at least a part of the impact load is received by the step part of the second chassis, and it becomes to be possible to reduce the impact load reached to the hinge mechanism.

Further, in one embodiment of the present invention, it is preferable that a cavity is formed in the edge portion including the projection part of the first chassis, a wireless communication antenna is disposed within the cavity so that an antenna substrate is perpendicular to a display screen of the display section.

According to this construction, the antenna substrate is disposed within the cavity formed in the edge portion including the projection part of the first chassis so that it is perpendicular to a display screen of the display section. Therefore, it becomes to be possible to ensure a long distance from the antenna substrates to the display screen and obtain the better antenna characteristics without need of enlarging the width of the escutcheon part of the first chassis. Further, as explained above, the second chassis is provided with the step part for receiving the projection part of the first chassis in the state where the second chassis is closed together with the first chassis, and the projection part of the first chassis is received and taken in the step part of the second chassis. Therefore, the thickness of whole the information-processing equipment is not affected by a projecting amount of the projection part (that is, by a width dimension of the antenna substrate disposed within the projection part), and it is not an obstructive factor in aiming to make the information-processing equipment further thinner.

BRIEF DESCRIPTION OF THE DRAWINGS

The present invention will be described in detail with reference to the accompanying drawings.

DETAILED DESCRIPTION OF THE PREFERRED EMBODIMENTS

Hereinafter, an embodiment of the present invention will be explained in detail, by taking a so-called laptop PC as an example, with reference to the accompanying drawings.

In the following description, some terms which respectively indicate specific directions ("up", "down", "left", "right" and other terms include their concept, "clockwise direction", "counter-clockwise direction", for example) may be used. However, it is to be noted that those terms are used to facilitate understanding of the present invention with reference to the accompanying drawings. And, the present invention should not be interpreted in a limited way by meanings of those terms.

Figure 1:
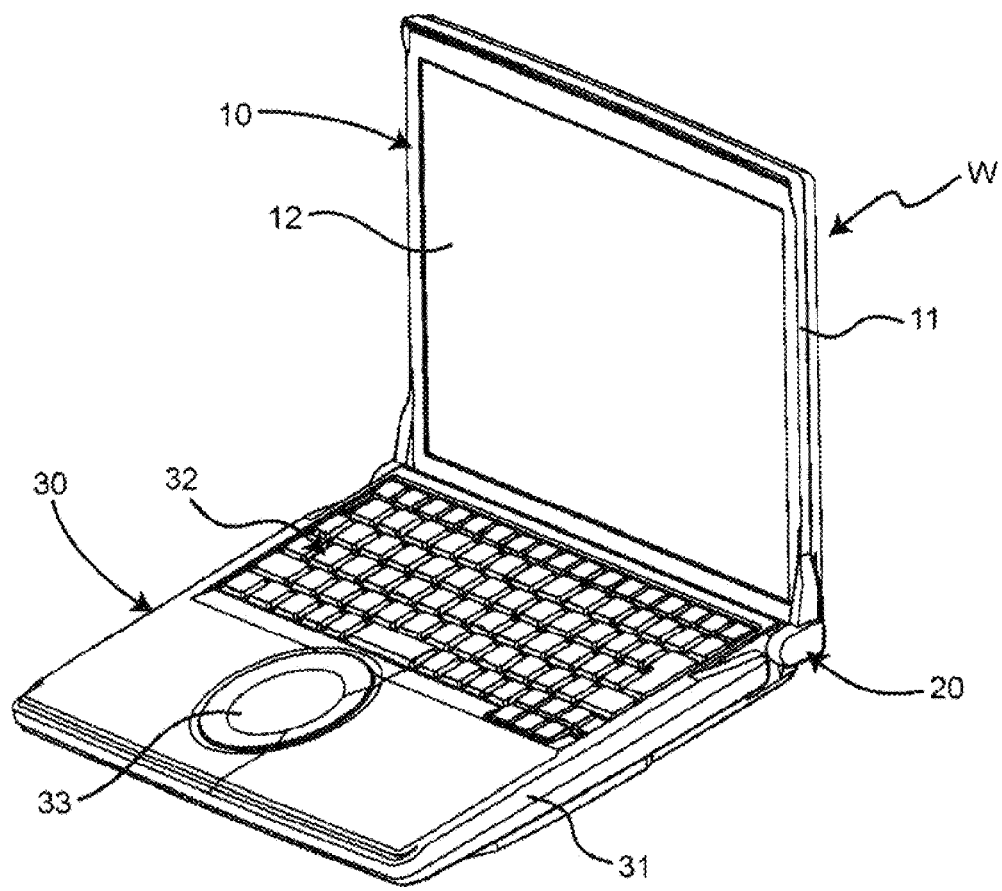
FIG. 1 is an overall perspective view of a laptop PC according to an embodiment of the present invention in an enabled state.
Figure 2:
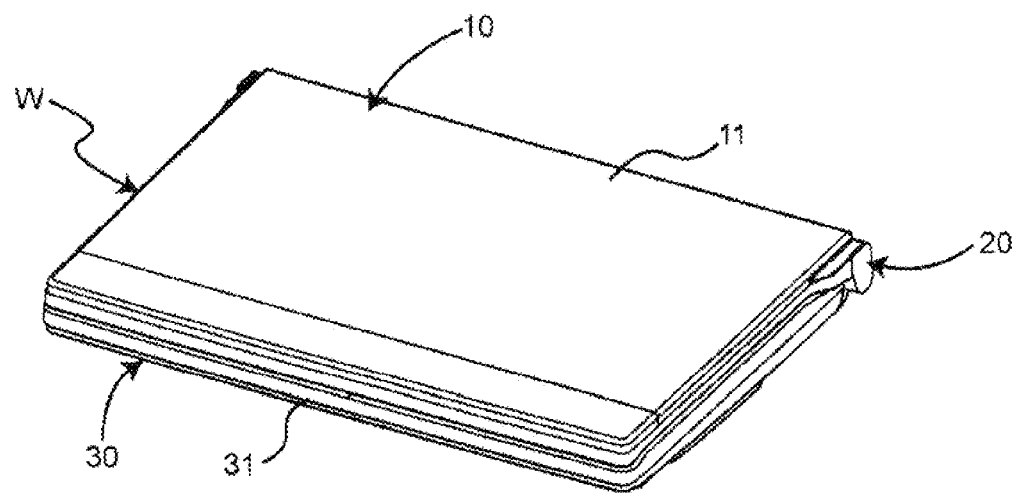
FIG. 2 is an overall perspective view of the laptop PC in a nonuse (closed) state.
Figure 3:
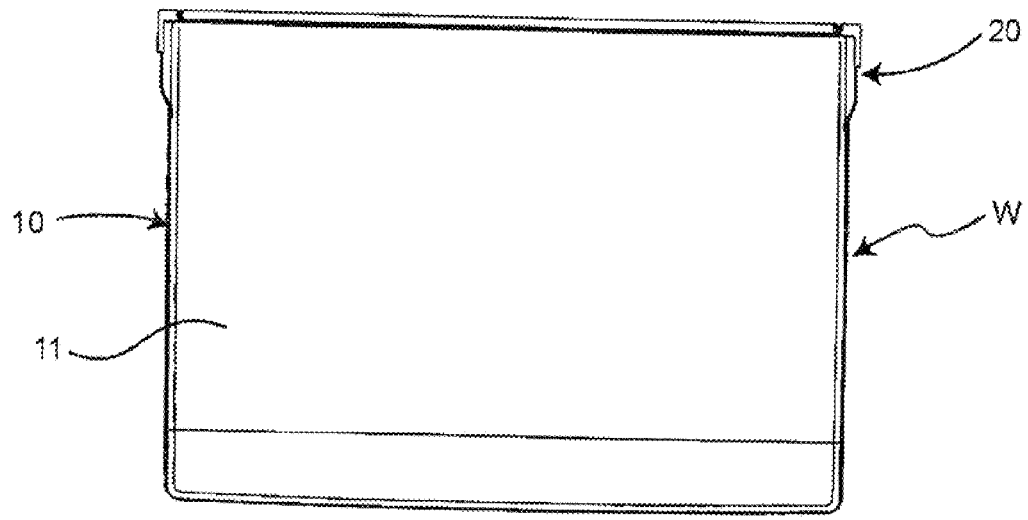
FIG. 3 is a plane view of the laptop PC in a nonuse (closed) state.
Figure 4:
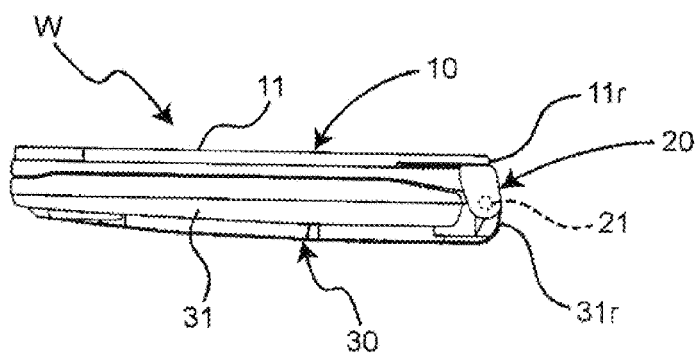
FIG. 4 is a side view of the laptop PC in a nonuse (closed) state.

FIGS. 1 and 2 are perspective views showing the laptop PC according to the present embodiment in an enable state and a nonuse (closed) state. And, FIGS. 3 and 4 are a plane view and a side view of the laptop PC in the nonuse (closed) state.

As shown in these drawings, the laptop PC W as an electronic equipment according to the present invention is provided with a display section 10 having a display screen 12 such as a liquid crystal type, and an operation control section 30 capable of generating a display signal which is to be inputted into the display section 10. The operation control section 30 includes an input device 32 such as a keyboard, signal processing circuits for generating display signals outputted to the display section based on input operations by the input device, a central processing unit (so-called CPU: not shown), and peripheral components thereof (also, not shown). Also, a touch-pad is provided on a near side viewing from a user in a state the user operates the laptop PC W, the user can conduct a cursor motion, a scroll of the display screen 12 and the like only by going over the touch-pad from right to left or up and down with the finger.

The display section 10 is accommodated in a chassis 11 (a first chassis) for the display section side, and a periphery and a back face of the display section 10 are covered by the first chassis. On the other hand, the operation control section 30 is accommodated in a chassis 31 (a second chassis) for the operation control section side. And both the chassis are coupled to each other by a hinge mechanism 20 in a relatively openable and closable manner.

In more detail, both the first chassis 11 and the second chassis 31 have an overall basic shape of substantially rectangle in a planar view (that is, in a state of viewing from the front side thereof). And, one side 11*r* of the first chassis 11 and one side 31*r* of the second chassis 31 (that is, both the rear sides viewing from the user in a state that the laptop PC W is folded) are coupled via the hinge mechanism 20. Thereby, the first chassis 11 and the second chassis 31 can move in a relatively openable and closable manner around a hinge axle 21 (refer to FIG. 4).

It is to be noted that the "rectangle" includes a "square" as one configuration thereof in the present specification.

Figure 5:
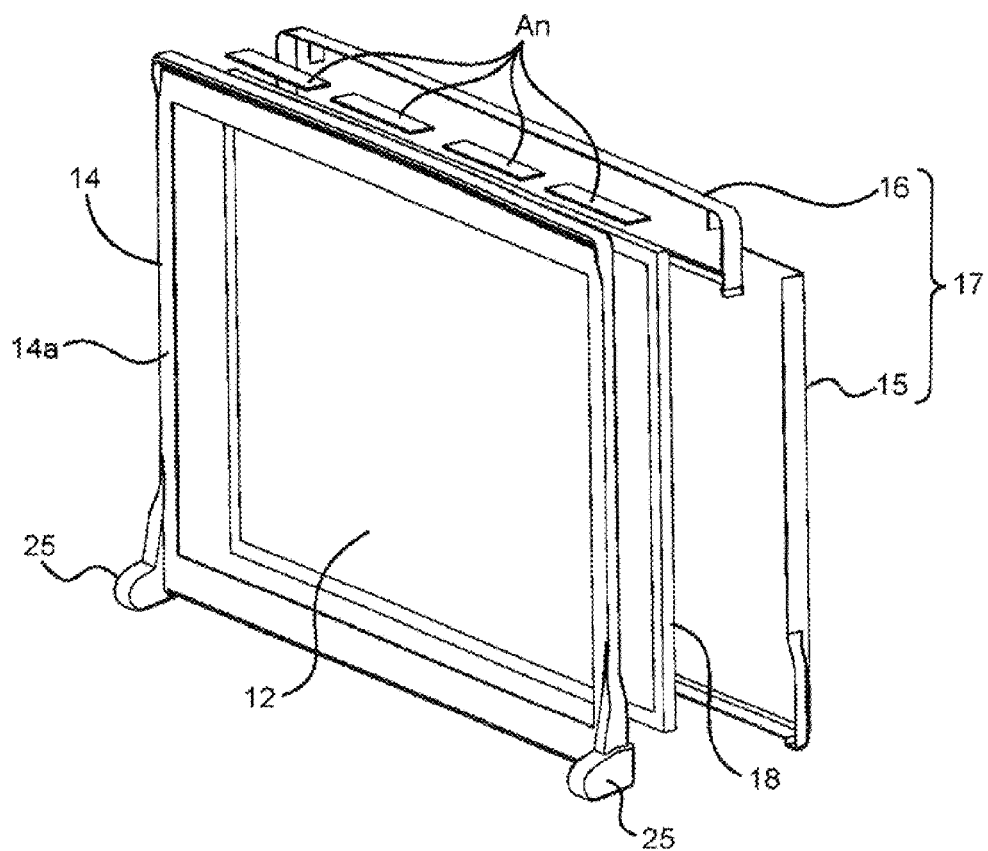
FIG. 5 is an exploded perspective view schematically showing the constitution of the first chassis of the laptop PC.

FIG. 5 is an exploded perspective view schematically showing the constitution of the first chassis 11. As shown in this figure, the first chassis 11 is consist of a base frame 14 which forms a quadrate frame in a front view, a back panel 15 disposed facing to the base frame 14 and an upper cover 16 which is joined to an upper section of the back panel 15. A liquid-crystal panel 18 of which the surface is covered with a glass plate is held between the base frame 14 and the back panel 15 with the upper cover 16. An outer panel 17 of the first chassis 11 is formed by integrally joining the back panel 15 and the upper cover 16 to each other.

The back panel 15 is, preferably, made of metal such as magnesium (Mg) in order to ensure the mechanical rigidity and the like, and both of the base frame 14 and the upper cover 16 are, preferably, made of plastic, for example. Also, the major portions of the second chassis is, preferably, made of metal such as magnesium (Mg) in order to ensure the mechanical rigidity.

A cover member 25 (hinge cover) of the hinge mechanism 20 is integrally formed at the right and left ends of the base end side (the lower side in FIG. 5) of the base frame 14. Such a hinge cover 25 may be provided separately from the base frame 14. A front surface of the frame body of the base frame 14 is so-called escutcheon part 14a which forms a border part positioned between an outer periphery of the first chassis 11 and the glass plate of the display screen 12 in an assembled state of the display section 10. The escutcheon part 14a is to define an effective display screen of the liquid crystal panel 18 and to play a roll of a kind of decorative panel.

In the present embodiment, as explained in detail later, wireless communication antennas are mounted to the first chassis 11 side. As mentioned above, it is common knowledge that a better antenna characteristics is obtained with longer distance from the antenna substrates An to the display screen 12 (that is, to the drive circuits of the display screen 12) in mounting the antenna substrates An to the first chassis 11 of the display section side. When the antenna substrates An are disposed in parallel to the display screen 12 like the conventional art (refer to Japanese Patent Laid-open Publication No. 2008-28907), it is required, in order to ensure a long distance from the antenna substrates An to the display screen 12, to enlarge the width of the escutcheon part 14a of the first chassis 11. However, enlarging the width of the escutcheon part 14a is to result in restraining the size of the display screen 12.

Then, it is conceivable to arrange the antenna substrates An at the end portion of the other side (that is, front side viewing from the user in a state that the laptop PC W is folded) opposing to the one side 11r (hinge side) of the first chassis 11, so that the antenna substrates An extend in parallel to the end surface, that is, perpendicular to the display screen 12. According to such a constitution, it is possible to ensure a longer distance from the antenna substrates An to the display screen 12 without enlarging the width of the escutcheon part 14a of the first chassis 11.

However, in the arrangement in which the antenna substrates An is disposed perpendicular to the display screen 12, the width dimension of the end surface of the other side opposing to the one side 11r (hinge side) of the first chassis 11 must be, by necessity, larger than the width dimension of the antenna substrates An. Accordingly, the thickness in whole of the first chassis 11 depends on the width dimension of the antenna substrates An. This may bring disadvantage in aiming to make the first chassis 11 and, eventually, whole the laptop PC W further thinner.

Therefore, in the present embodiment, as explained below, in order to enable to ensure a longer distance from the antenna substrates An to the display screen 12 (that is, to the liquid crystal panel 18) and obtain the better antenna characteristics in mounting the antenna substrates An to the first chassis 11, the laptop PC W is constituted so that its entire thickness is not affected, even the antenna substrates An are disposed perpendicular to the display screen 12 (that is, perpendicular to the liquid crystal panel 18).

Figure 6:
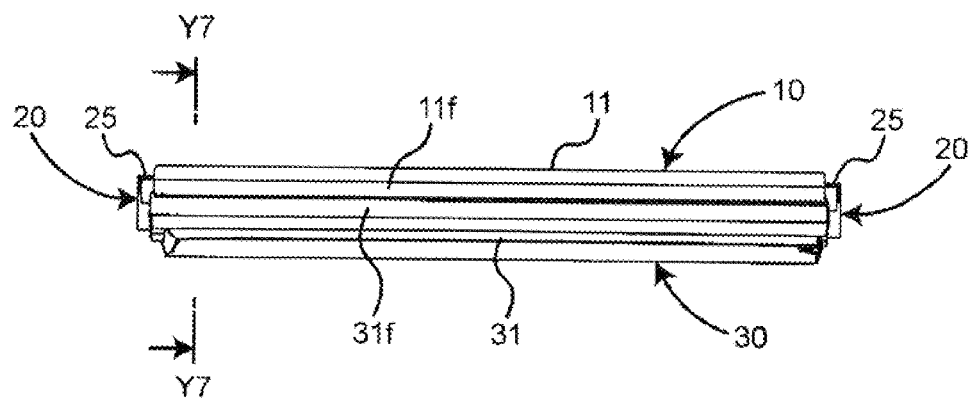
FIG. 6 is a front view of the laptop PC in a nonuse (closed) state.
Figure 7:
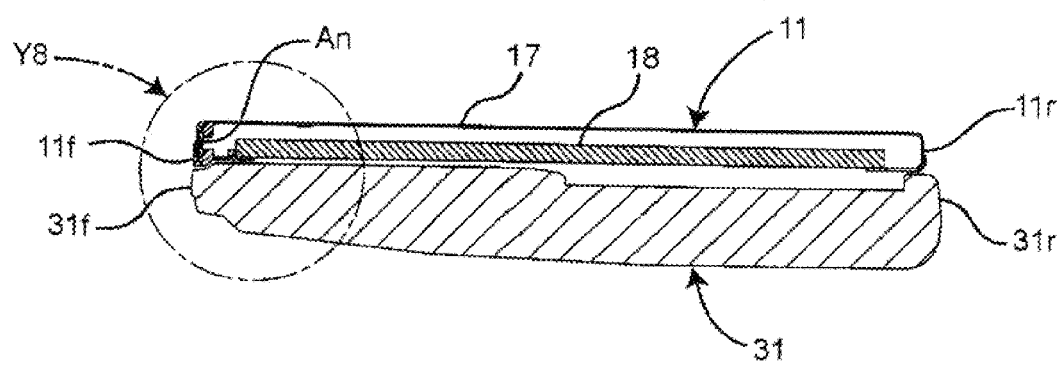
FIG. 7 is a vertical cross-sectional view taken along a line Y7-Y7 in FIG. 6.
Figure 8:
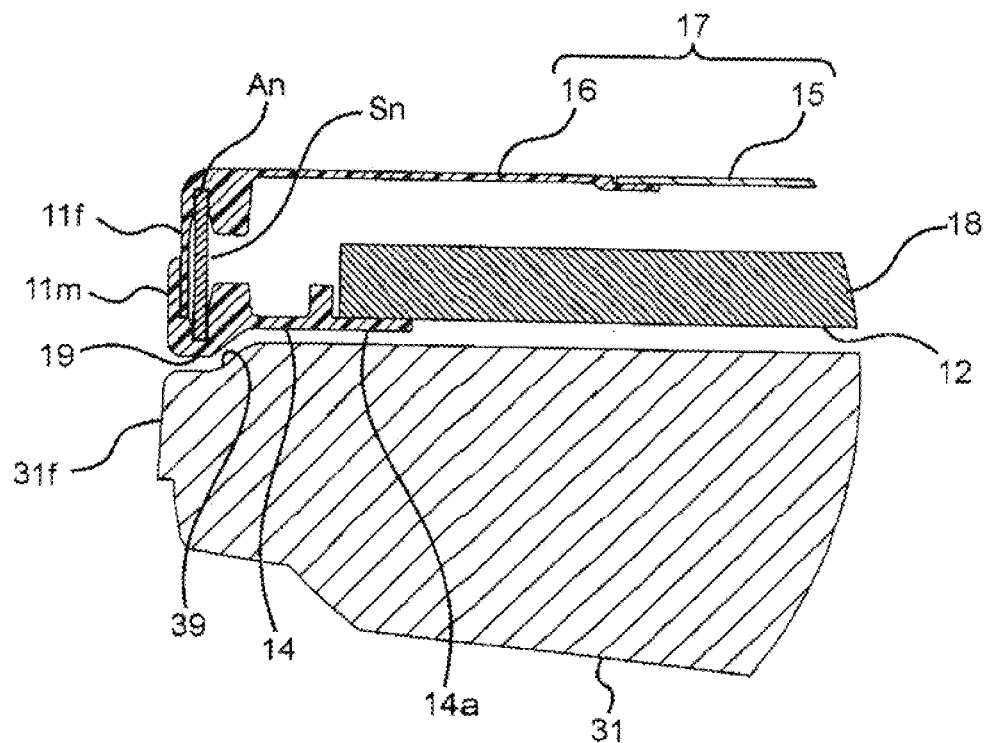
FIG. 8 is an enlarged cross-sectional view showing in close-up a major portion (Y8 portion) of FIG. 7.

FIG. 6 is a front view of the laptop PC in a nonuse (closed) state, FIG. 7 is a vertical cross-sectional view taken along a line Y7-Y7 in FIG. 6 and FIG. 8 is an enlarged cross-sectional view showing in close-up a major portion (Y8 portion) of FIG. 7.

As shown in these drawings, in the present embodiment, in order to provide sufficient torsion rigidity to endure the torsion generated by the opening and/or closing motion when the user opens and/or closes the first chassis 11 by holding the peripheral portion thereof, the first chassis 11 is provided with a projection part 19 at an edge portion of the other side 11f, the projection part 19 is formed along the other side 11f and projecting to the second chassis 31 side in a state where the first chassis 11 is closed together with the second chassis 31. The projection part 19 is constituted by bending the other side 11f so as to form a hollow cavity and, preferably, extends all over the length of the other side 11f.

According to the present embodiment, the rigidity of the first chassis 11 can be enhanced by a relatively simple constitution only to provide such a "projection part 19 extending along the other side 11f" to the first chassis 11, and it becomes to be possible relatively easily to enhance the torsion rigidity to endure the torsion generated by the opening and/or closing motion and/or restrain effect against the change of display characteristics of the liquid crystal panel 18 caused by a holding force applied to the peripheral portion when the user opens and/or closes the first chassis 11 by holding the peripheral portion thereof in making the transition between the open state and the closed state of the laptop PC W. Further, when the user opens and/or closes the first chassis 11 by holding the edge portion of the other side 11f thereof, the holding performance also can be enhanced.

On the other hand, the second chassis 31 is provided with a step part 39 at a edge portion of the other side 31f, the step part 39 is formed along the other side 31f and receiving the projection part 19 of the first chassis 11 in a state where the second chassis 31 is closed together with the first chassis 11. Thereby, the projection part 19 of the first chassis 11 is received and taken in the step part 39 of the second chassis 31 in a state where the first and second chassis 11 and 31 are closed together with each other.

Accordingly, it is no need to increase the thickness in whole of the laptop PC W, even the first chassis 11 is provided, at the edge portion of the other side 11f, with a projection part 19 for projecting to the second chassis 31 side in a state where the first chassis 11 is closed together with the second chassis 31. Further, the second chassis 31 is provided with the step part 39 for receiving the projection part 19 of the first chassis 11 in a state where the second chassis 31 is closed together with the first chassis 11. Thereby, when an impact load is applied to the laptop PC W, in a state where the first, chassis 11 and the second chassis 31 are closed together, from front side surface or forward and upward direction, at least a part of the impact load is received by the step part 39 of the second chassis 31, and it becomes to be possible to reduce the impact load reached to the hinge mechanism 20. Therefore, the hinge mechanism 20 does not need to be excessively firm, thereby it becomes to be possible to make the laptop PC W further lighter and thinner. Furthermore, the curvature of the corner portion formed by the front surface and the principal surface of the second chassis 31 is increased by providing the step part 39. Thereby, the toughness against the impact load received by the front surface itself and the forward and upper part itself of the second chassis 31 are enhanced.

Still further, in the present embodiment, the cavity Sn is formed in the edge portion including the projection part 19 of the first chassis 11, and the wireless communication antenna is arranged within the cavity Sn so that the antenna substrates An are perpendicular to the display screen 12 (that is, perpendicular to the liquid crystal panel 18). That is, those antenna substrates An are arranged at the end portion of the other side 11$f$ (that is, upper side in the state where the laptop PC W is used) opposing to the one side 11$r$ (hinge side) of the first chassis 11, so that the antenna substrates An extend in parallel to the end surface 11$m$.

In the present embodiment, preferably, a plurality of (e.g. four: refer to FIG. 5) antenna substrates An formed into substantially rectangular shapes are prepared, and each of these antenna substrates An is disposed so that its longitudinal sides extend along the other side 11$f$ in parallel to the end surface 11$m$. It is to be noted, although not shown concretely in drawings, that a metal fitting to be connected to antenna elements on the antenna substrate An and a connection cable are attached to each antenna substrate An.

As shown in detail in FIG. 8, each antenna substrate An is secured and hold within the cavity Sn in the edge portion of the first chassis 11 including the projection part 19 in a state where the antenna substrate An is sandwiched and held between the edge portion of the base frame 14 made of plastic and the edge portion of the upper cover 16 also made of plastic. According to such a constitution, the distance from the antenna substrate An to the display screen 12 (that is to the liquid crystal panel 18) is ensured as more than a range of about 8-10 mm. And, it becomes to be possible to restrain a deterioration of transmitting and receiving characteristics of the antenna caused by a electrical interference between the antenna substrate An and the drive circuit for driving the liquid crystal panel 18, and a good antenna characteristics can be obtained.

As explained above, the antenna substrates An are disposed within the cavity Sn formed in the edge portion including the projection part 19 of the first chassis 11 so that it is perpendicular to a display screen 12 of the display section 10. Therefore, it becomes to be possible to ensure a longer distance from the antenna substrates An to the display screen 12 and obtain the better antenna characteristics without need of enlarging the width of the escutcheon part 14$a$ of the first chassis 11. Further, as explained above, the second chassis 31 is provided with the step part 39 for receiving the projection part 19 of the first chassis 11 in the state where the second chassis 31 is closed together with the first chassis 11, and the projection part 19 of the first chassis 11 is received and taken in the step part 39 of the second chassis 31. Therefore, the thickness of whole the first chassis 11 is not affected by a projecting amount of the projection part 19 (that is, by a width dimension of the antenna substrate An disposed within the projection part 19), and it is not an obstructive factor in aiming to make the first chassis 11 further thinner.

In the above described embodiment, the projection part 19 of the first chassis 11 and the step part 39 of the second chassis 31 are provided for substantially all over the length of the other side 11$f$ of the first chassis 11 and for substantially all over the length of the other side 31$f$ of the second chassis 31, respectively. However, they may have partially interrupted portions when needed, unless they can ensure the required torsion rigidity of the first chassis 11 or they can ensure the required effect of reducing the impact load reached to the hinge mechanism 20. A certain degree of the effect will be obtained by providing the projection part and the step part only to portions of the other sides 11$f$, 31$f$ corresponding to the places where the plurality of (e.g. four) antenna substrates An having predetermined lengths are disposed.

It is to be noted, although the above described embodiment exemplify a laptop PC, that the present invention is not limited to the above-described embodiment, and is effectively applicable also to various other information-processing equipments having a first chassis accommodating a display section and a second chassis accommodating an operation control section, specifically to those having wireless communication antennas disposed within the first chassis side.

The present invention is not limited to the above-described embodiment and variations thereof, and various modifications and changes may be made without departing from the spirit and scope of the invention.

INDUSTRIAL APPLICABILITY

The present invention can be utilized as a structure of the chassis in information-processing equipments such as laptop personal computers.

What is claimed is:
1. Information processing equipment comprising:
a display section having a display screen;
an operation control section capable of generating a display signal to be inputted into the display section;
a first chassis accommodating the display section and covering a periphery and a back face of the display section, the first chassis having a cross section that is substantially rectangular;
a second chassis accommodating the operation control section and having a cross section that is substantially rectangular; and
a hinge mechanism coupling a first side of the second chassis and a first side of the first chassis and supporting both the first chassis and the second chassis movably relative to each other between an open state and a closed state,
wherein the first chassis includes a projection part at an edge portion of a second side of the first chassis opposite to the first side, the projection part being formed along the second side and projecting toward the second chassis in the closed state of the first and second chassis,
wherein a cavity is formed in the edge portion of the first chassis which includes the projection part of the first chassis, and a wireless communication antenna is disposed within the cavity such that an antenna substrate is perpendicular to the display screen of the display section, and
wherein the antenna is spaced apart from the display screen such that a space is formed between the antenna and the display screen.
2. The information processing equipment of claim 1, wherein a portion of the cavity is disposed between the antenna and the display screen.
3. The information processing equipment of claim 1, wherein the first chassis includes a projection part at an edge portion of a second side of the first chassis opposite to the first side, the projection part being formed along the second side and projecting toward the second chassis in the closed state of the first and second chassis, wherein the first chassis includes projections at the first side of the first chassis, and the projections engage the second chassis in the closed state of the first and second chassis, wherein the second chassis includes a first step part at an edge portion of a second side of the second chassis opposite to the first side, the first step part is formed along the second side and receives the projection part of the first chassis in the closed state of the first and second chassis, and wherein the second chassis includes second step parts disposed at the first side of the second chassis, and the second step parts respectively receive the projections of the first side of the first chassis in the closed state of the first and second chassis.

\* \* \* \* \*